United States Patent
Sheppard

Patent Number: 5,527,361
Date of Patent: *Jun. 18, 1996

[54] LOW TEMPERATURE PROCESS FOR BLEACHING TEXTILES

[75] Inventor: Sherman H. Sheppard, Pinnacle, N.C.

[73] Assignee: Surry Chemicals, Inc., Mt. Airy, N.C.

[*] Notice: The term of this patent shall not extend beyond the expiration date of Pat. No. 5,482,516.

[21] Appl. No.: 334,141

[22] Filed: Nov. 4, 1994

Related U.S. Application Data

[63] Continuation-in-part of Ser. No. 67,515, May 24, 1993, abandoned.

[51] Int. Cl.⁶ .................................................. D06L 3/02
[52] U.S. Cl. ..................................... 8/111; 252/186.28
[58] Field of Search .......................... 8/111; 252/186.28, 252/94, 95, 103

[56] References Cited

U.S. PATENT DOCUMENTS

| | | | |
|---|---|---|---|
| 4,337,060 | 6/1982 | Dalmas | 8/111 |
| 4,363,699 | 11/1982 | DeCeuster et al. | 8/11 |
| 4,496,472 | 1/1985 | Schäfer et al. | 252/186.22 |
| 5,333,475 | 8/1994 | Edmundson et al. | 68/27 |
| 5,482,516 | 1/1996 | Sheppard | 8/111 |

FOREIGN PATENT DOCUMENTS 2035047  1/1972  Germany.

*Primary Examiner*—Stephen Kalafut
*Assistant Examiner*—Alan D. Diamond
*Attorney, Agent, or Firm*—Rhodes, Coats & Bennett

[57] ABSTRACT

A rapid, low temperature bleaching process for cellulosic materials such as cotton and cotton blends. The bleaching liquor includes a mixture of hydrogen peroxide, potassium hydroxide and a stabilizer combined with controlled time and temperature to produce a rapid bleach in between about 12 and 16 minutes. The resulting textile goods are soft, absorbent, mote-free with a Hunter Scale Whiteness Value of about 100 and less than about 0.75% extractable solids.

4 Claims, No Drawings

LOW TEMPERATURE PROCESS FOR BLEACHING TEXTILES

CROSS-REFERENCE TO RELATED APPLICATIONS

The present application is a continuation-in-part of U.S. patent application Ser. No. 08/067,515, filed May 24, 1993 now abandoned.

BACKGROUND OF THE INVENTION

1. Field of the Invention

The present invention relates generally to a process for bleaching cellulosic materials, such as cotton and cotton blends and, more particularly, to a rapid bleaching process for textile articles using a solution of hydrogen peroxide, potassium hydroxide and stabilizers to produce goods which are soft, absorbent, mote-free, and have excellent whiteness values.

2. Description of the Prior Art

The history of bleaching dates back to the Romans who burned sulfur inside their wool tents to produce sulfur dioxide. The valence of sulfur was supplied by wool when oxygen was removed from it. This process was not very effective because over time the wool would regain its natural yellow color by regaining the oxygen lost by reduction process.

Today, the most common type of bleaching process is the oxidation method. This process involves contributing oxygen to the textile material which would result in permanent whiteness. The most common chemicals used in oxidation processes are listed below:

(1) Sodium hypochlorite
(2) Hydrogen peroxide
(3) Peracetic acid
(4) Sodium chlorite Of the above four types, hydrogen peroxide is rapidly gaining in popularity because it is nonyellowing, nontoxic, and odorless. In addition, hydrogen peroxide does not have the effluent problem that is associated with chlorine bleaching. For example, during chlorine bleaching, there are chlorinated hydrocarbons formed which increase the BOD and COD levels.

It is well known that simple solutions of hydrogen peroxide are ineffective in bleaching with out additives. However, alkaline solutions of hydrogen peroxide produce too fast a rate of decomposition and thus must have a stabilizer to control the rate of hydrogen peroxide decomposition. For example, U.S. Pat. No. 4,363,699 teaches bleaching textile fabrics with hydrogen peroxide, sodium hydroxide and an alphahydroxyacrylic acid polymer stabilizer and U.S. Pat. No. 4,496,472 teaches using hydrogen peroxide, an alkali hydroxide and an oligomer of phosphonic acid ester stabilizer. However, such bleaching solutions usually require 40-50 minutes to produce acceptable whiteness values.

Prior bleaching solutions also have used sodium hydroxide along with sodium silicate for stabilization of hydrogen peroxide. For example, U.S. Pat. No. 4,337,060 teaches bleaching textile fabrics with potassium orthosilicate, water and hydrogen peroxide and with the reaction products of sodium silicate and potassium hydroxide. However, silicates form insoluble calcium and magnesium complexes and create a harsh hand on textile goods which can interfere with subsequent dyeing and sewing operations.

Thus, there remains a need for a new and improved bleaching process for cotton and cotton blends which rapidly bleaches to produce excellent whiteness while, at the same time, produces goods which are soft, absorbent, and mote-free.

SUMMARY OF THE INVENTION

The present invention is directed to a rapid bleaching process for cellulosic materials such as cotton and cotton blends. The chemical system of the present invention includes a mixture of hydrogen peroxide, potassium hydroxide and a stabilizer combined with controlled time and temperature to produce a rapid bleach in 10 minutes or less. The resulting textile goods are soft, absorbent, mote-free with a Hunter scale whiteness of 110 and above. Because a silicate stabilizer is not used and potassium hydroxide is used instead of sodium hydroxide as the alkali, less than 0.65% extractable solids are obtained. In the preferred embodiment, the present invention is carried out in a top transfer tunnel washer. This machine has previously been utilized for laundering but can be adapted to continuous bleaching using the present invention.

Accordingly, it is one aspect of the present invention is to provide a method of bleaching cellulosic materials including cotton and cotton blended fabrics. The method includes the steps of: (a) providing a silicate-free bleach liquor including hydrogen peroxide, potassium hydroxide, a stabilizer and water; (b) heating the bleach liquor to a temperature of less than about 180° F.; (c) immersing the cellulosic material in the bleach liquor of step (a); and (d) separating the bleach liquor from the cellulosic materials.

These and other aspects of the present invention will become apparent to those skilled in the art after a reading of the following description of the preferred embodiment.

DESCRIPTION OF THE PREFERRED EMBODIMENTS

In the following description, it is to be understood that such terms as "forward", "rearward", "left", "right", "upwardly", "downwardly", and the like are words of convenience and are not to be construed as limiting terms.

According to the present invention, cotton and cotton blends are bleached in a modified top transfer tunnel washer utilizing 10 sections. The 10 sections are divided as follows: (1) sections 1–4 are used for bleaching, (2) sections 5–8 are used for rinsing, and (3) sections 9–10 are used for softener application.

In the preferred apparatus for carrying out the present invention, a conventional top transfer tunnel-type continuous washer is modified by: (1) lowering the rotational oscillation angle and speed of the machine's inner drum structure relative to its normal washing settings; (2) altering the water counterflow positioning and characteristics; (3) maintaining the water in the various inner drum section modules at essentially identical, relatively high levels; and (4) modifying the bath temperature characteristics of the machine. One such modified tunnel washer is described in U.S. Pat. No. 5,333,475, issued Aug. 2, 1994, which is hereby incorporated by reference in its entirety. When used according to the present invention, the modified tunnel washer has a bleach zone disposed at its inlet end and into which the bleaching liquor is injected, a finish zone disposed at its outlet end into which a softening agent is injected, and a rinse zone positioned between the bleach and finish zones.

Each of the three zones is defined by one or more inner drum structures which may be tandem or single batch modules.

The bleaching concentrate of the present invention is made using the following chemicals and percentages (percentages based on the weight of the bath (O.W.B.) at a 10:1 ratio of concentrate to bath:

(1) 4.4% hydrogen peroxide-50%

(2) 1.8% potassium hydroxide-45%

(3) 1.5% magnesium salt stabilizer

In the preferred embodiment, the stabilizer is a mixture of MgO and citric acid. One such stabilizer is available from Surry Chemicals, Inc. of Mt. Airy, N.C. under the tradename Surchem 401. In addition, the following additional additives may be used:

(4) 2.1% wetter-scour (5) 0.9% optical

Socks are introduced into the first section of the tunnel washer as follows: The water in the washer is preheated to 200° F. and the first section is filled with gallons of the above bleaching concentrate per 100 gallons water. The liquor ratio is maintained at approximately 10:1 (10 parts water to 1 part fabric). Enough sections of the tunnel are used to allow the fabric a dwell time of 8 minutes. Titrations for percent hydrogen peroxide with potassium permanganate are performed. Titrations for percent alkali with 0.1N sulfuric acid also are performed to assure correct percentage between peroxide and alkali. Injections of 10 gallons of the bleaching concentrate are continued with each transfer of goods from sections 1 to unless the titrations for peroxide or alkali warrant a further adjustment. After the goods are bleached in the first four chambers, they are then rinsed in sections 5–8.

In the preferred embodiment, the water is flowed from the ninth chamber and heated to the following ranges: (1) Section 5 and 6 temperature is between 160 and 180° F.; (2) Section 7 and 8 temperature is between 140 and 160° F.; (3) Section 9 chamber is used to cool down the goods prior to entering the 10th chamber. A temperature of 120° F. is preferred. More chambers may be used to improve rinsing or to increase the throughput of the tunnel.

In section 10 softener is applied at a temperature of 100° to 110° F. This bath is to remain static so as not to lose softener injection. A gradual temperature decline is necessary to prevent wrinkles in the textile goods.

The present invention can best be understood after a review of the following examples:

EXAMPLE 1

Test runs were done with the tunnel under the conditions described below for various dwell times and temperatures. The tunnel contained 10 sections. Approximately 100 gallons/section of water was added to the first four sections. After heating the water to 200° F., 10 gallons of the above described bleaching concentrate was added. Eighty pounds of cotton/nylon blend socks were added to charge section 1 containing 100 gallons of bath (10:1 ratio of liquor to goods). The socks stayed in each section for between 2 and 2.5 minutes. The four sections are set to block the entry of liquor or water from the following six chambers. To compensate for the loss of water (approximately 40 gallons are loss) with each transfer, hot water was added to the entry end. The total dwell time in the bleaching chambers was about 8 minutes. After the goods are bleached in the first four chambers, they were then rinsed in the next four chambers. The water was flowed from the ninth chamber and heated to the following ranges: (1) Sections 5 and 6 temperature was between 160° and 180° F. The higher temperature is preferred for better rinsing. (2) Sections 7 and 8 temperature was between 140° and 160° F. (3) Section 9 chamber was used to cool down the goods prior to entering the 10th chamber. A temperature of 120° F. is preferred. In Section 10 softener was applied at a temperature of 100° to 110° F. Under the above conditions, 130 lots (each lot weighing approximately 80 lbs) were bleached in the tunnel with the whiteness being consistent throughout each lot. The treated goods were soft, absorbent, mote-free, and had excellent whiteness values on a Hunter scale of greater than about 110.

The specific requirements of the bleaching process in the tunnel based on the results of the above example are as follows: Dwell time in the chemical bath should be between about 4 and 16 minutes with 8 minutes at 200° F. being preferred. Temperature can be decreased if dwell time is increased. The bleach sections of the tunnel should be set so as not to dilute the bleaching liquor. The rinse should be sufficient to obtain a neutral pH on the goods before they reach the softener chamber. In the first rinse chamber, 180° F. water, can be used for make up water. Finally, the softener section of tunnel should be a static bath so that softener dilution from incoming water will not be a problem.

Different configuration of the tunnel using more or less chambers may be used as long as certain constants remain. These constants include the temperature of the bleach bath should be between about 190° F. and 210° F. for bleaching times of between about 4 and 8 minutes. In addition, the pounds of rinse water per pound of fabric should be about 32:1. Bath concentration and exposure times can be adjusted to conform to different tunnel configuration.

EXAMPLE 2

Test runs were done with the tunnel under the conditions described above for various dwell times and temperatures with sodium hydroxide being substituted for potassium hydroxide. The tunnel contained 10 sections. Approximately 100 gallons/section of water was added to the first four sections. After heating the water to 200° F., 10 gallons of the above described bleaching concentrate was added. Eighty pounds of cotton/nylon blend socks were added to section 1 containing 100 gallons of bleaching liquor (10:1 ratio of liquor to goods). The socks stayed in each section for between 1 and 2.5 minutes for total bleaching times of 4, 8 and 10 minutes. The four sections were set to block the entry of liquor or water from the following six chambers. To compensate for the loss of water (approximately 40 gallons are loss) with each transfer, hot water was added to the entry end. The dwell time in each of the bleaching chambers was about 8 minutes. After the goods are bleached in the first four chambers, they were then rinsed in the next four chambers. The water was flowed from the ninth chamber and heated to the following ranges: (1) Sections 5 and 6 temperature was between 160° and 180° F. The higher temperature is preferred for better rinsing. (2) Sections 7 and 8 temperature was between 140° and 160° F. (3) Section 9 chamber was used to cool down the goods prior to entering the 10th chamber. A temperature of 120° F. is preferred. In Section 10 softener was applied at a temperature of 100° to 110° F. The treated goods were tested for % extractables and measured for whiteness.

Table 1 compares the amount of extractable solids of the above bleaching procedure with the only change being using the prior art sodium hydroxide in place of potassium hydroxide of the subject invention. The lower percent extractables may be due to the higher solubility of potassium versus sodium. In addition, because of the excellent solubility of potassium hydroxide, less water is necessary in rinsing. For example, using the top transfer tunnel washer, only 4 gallons of water per pound of goods was used to rinse the material to produce low residual solids. The incoming rinse water was supplied at 100° F. The total time in the tunnel for bleaching, rinsing and softener application was about 40 minutes or less.

TABLE 1

Extractable Solids On Textile Goods Bleached With Potassium Hydroxide And Sodium Hydroxide

| Bleaching Time (minutes) | % Extractables (KOH) | % Extractables (NaOH) |
|---|---|---|
| 4 | 0.19 | 0.30 |
| 8 | 0.30 | 0.67 |
| 10 | 0.26 | 0.71 |

% Extractables are run using Soxhlet Extraction Procedure With Petroleum Ether as the solvent.

As can be seen, the total extractable solids using potassium is about ½ the total extractable solids using sodium hydroxide. This produces a treated textile article which are soft, absorbent, and mote-free.

Table 2 compares the whiteness values of the above bleaching procedure with the only change being using the prior art sodium hydroxide in place of potassium hydroxide of the subject invention. The total time in the tunnel for bleaching, rinsing and softener application was about 40 minutes or less.

TABLE 2

Whiteness Values Of Textile Goods Bleached With Potassium Hydroxide And Sodium Hydroxide

| Bleaching Time (minutes) | Hunter Scale (KOH) | Hunter Scale (NaOH) |
|---|---|---|
| 4 | 110 | 106 |
| 8 | 117 | 109 |
| 10 | 121 | 115 |

As can be seen from Tables 1 and 2, only the KOH containing concentrate produces goods in less than about minutes bleaching time having a Hunter Whiteness Value greater than about 110 and a total extractable solids of less than about 0.65%. It is expected that this relationship would also exist for bleaching times of less than about 16 minutes. This resulting textile articles are soft, absorbent, and mote-free.

In an alternative, low temperature embodiment of the invention which is the subject of this continuation-in-part application, socks are introduced into the first section of the tunnel washer as follows: The water in the washer is preheated to between about 160° and 175° F. and the first section is filled with between about 10 and 12 gallons of the above bleaching concentrate per 100 gallons water. The liquor ratio is maintained at approximately 10:1 (10 parts water to 1 part fabric). Enough sections of the tunnel are used to allow the fabric a dwell time of 8 minutes.

Titrations for percent hydrogen peroxide with potassium permanganate are performed. Titrations for percent alkali with 0.1N sulfuric acid also are performed to assure correct percentage between peroxide and alkali. Injections of between about 10 and 12 gallons of the bleaching concentrate are continued with each transfer of goods from sections 1 to 4 unless the titrations for peroxide or alkali warrant a further adjustment. After the goods are bleached in the first four chambers, they are then rinsed in sections 5–8.

Like in the parent embodiment, the water is flowed from the ninth chamber and heated to the following ranges: (1) Section 5 and 6 temperature is between 160° and 180° F.; (2) Section 7 and 8 temperature is between 140° and 160° F.; (3) Section 9 chamber is used to cool down the goods prior to entering the 10th chamber. A temperature of 120° F. is preferred. More chambers may be used to improve rinsing or to increase the throughput of the tunnel.

In section 10 softener is applied at a temperature of 100° to 110° F. This bath is to remain static so as not to lose softener injection. A gradual temperature decline is necessary to prevent wrinkles in the textile goods.

The present invention can best be understood after a review of the following example:

EXAMPLE 3

Test runs were done with the tunnel under the conditions described below for various dwell times and temperatures. The tunnel contained 10 sections. Approximately 100 gallons/section of water was added to the first four sections. After heating the water to various temperatures between about 160° and 175° F., various amounts between about 10 and 12 gallons of the above described bleaching concentrate was added. Eighty pounds of cotton/nylon blend socks were added to charge section 1 containing 100 gallons of bath (10:1 ratio of liquor to goods). The socks stayed in each section for between 2 and 2.5 minutes. The four sections are set to block the entry of liquor or water from the following six chambers. To compensate for the loss of water (approximately 40 gallons are loss) with each transfer, hot water was added to the entry end. The total dwell time in the bleaching chambers was between about 12 and 16 minutes. After the goods are bleached in the first four chambers, they were then rinsed in the next four chambers. The water was flowed from the ninth chamber and heated to the following ranges: (1) Sections 5 and 6 temperature was between 160° and 180° F. The higher temperature is preferred for better rinsing. (2) Sections 7 and 8 temperature was between 140° and 160° F. (3) Section 9 chamber was used to cool down the goods prior to entering the 10th chamber. A temperature of 120° F. is preferred. In Section 10 softener was applied at a temperature of 100° to 110° F. Under the above conditions, 200 lots (each lot weighing approximately 80 lbs) were bleached in the tunnel with the whiteness being consistent throughout each lot. The treated goods were soft, absorbent, mote-free, and had excellent whiteness values on a Hunter scale of greater than about 100.

The specific requirements of the bleaching process in the tunnel based on the results of the above example are as follows: Dwell time in the chemical bath should be between about 12 and 16 minutes with 16 minutes at less than 180° F. being preferred. It has been found, according to the above examples, that the temperatures preferred in the parent application can be decreased to below 180° F. if dwell time and concentration are increased just slightly, thereby creating tremendous energy savings over the parent invention and the prior art.

The bleach sections of the tunnel should be set so as not to dilute the bleaching liquor. The rinse should be sufficient to obtain a neutral pH on the goods before they reach the softener chamber. In the first rinse chamber, 180° F. water, can be used for make up water. Finally, the softener section of tunnel should be a static bath so that softener dilution from incoming water will not be a problem.

Different configuration of the tunnel using more or less chambers may be used as long as certain constants remain. These constants include the temperature of the bleach bath should be between about 160° F. and 175° F. for bleaching times of between about 12 and 16 minutes. In addition, the pounds of rinse water per pound of fabric should be about 32:1. Bath concentration and exposure times can be adjusted to conform to different tunnel configuration.

Table 3 compares the amount of extractable solids of the above bleaching procedure compared with the parent application with the only changes being lowering temperature and increasing dwell times and concentration slightly and also comparing the prior art sodium hydroxide in place of potassium hydroxide of the subject invention.

The lower percent extractables may be due to the higher solubility of potassium versus sodium. In addition, because of the excellent solubility of potassium hydroxide, less water is necessary in rinsing. For example, using the top transfer tunnel washer, only 4 gallons of water per pound of goods was used to rinse the material to produce low residual solids. The incoming rinse water was supplied at 100° F. The total time in the tunnel for bleaching, rinsing and softener application was about 40 minutes or less.

TABLE 3

Extractable Solids On Textile Goods Bleached With Potassium Hydroxide And Sodium Hydroxide

| Bleaching Time (minutes) | % Extractables (KOH) | % Extractables (NaOH) |
| --- | --- | --- |
| Parent Invention | | |
| 4 | 0.19 | 0.30 |
| 8 | 0.30 | 0.67 |
| 10 | 0.26 | 0.71 |
| Present Invention | | |
| 12 | 0.41 | 0.82 |
| 16 | 0.38 | 0.74 |

% Extractables are run using Soxhlet Extraction Procedure With Petroleum Ether as the solvent.

As can be seen, the total extractable solids using potassium is about ½ the total extractable solids using sodium hydroxide. This produces a treated textile article which are soft, absorbent, and mote-free.

Table 4 compares the whiteness values of the above bleaching procedure compared with the parent application with the only changes being lowering temperature and increasing dwell times and concentration slightly and also comparing the prior art sodium hydroxide in place of potassium hydroxide of the subject invention. The total time in the tunnel for bleaching, rinsing and softener application was about 40 minutes or less.

TABLE 4

Whiteness Values Of Textile Goods Bleached With Potassium Hydroxide And Sodium Hydroxide

| Bleaching Time (minutes) | Hunter Scale (KOH) | Hunter Scale (NaOH) |
| --- | --- | --- |
| Parent Invention | | |
| 4 | 110 | 106 |
| 8 | 117 | 109 |
| 10 | 121 | 115 |
| Parent Invention | | |
| 12 | 102 | 92 |
| 16 | 104 | 98 |

As can be seen from Tables 3 and 4 only the KOH containing concentrate produces goods in less than about 16 minutes bleaching time and at less than about 180° F. having a Hunter Whiteness Value still about 100 and a total extractable solids of less than about 0.75%. This resulting textile articles are soft, absorbent, and mote-free while creating tremendous energy savings over the parent invention and the prior art.

Certain modifications and improvements will occur to those skilled in the art upon a reading of the foregoing description. By way of example, while the process of the present invention is preferably conducted in a top transfer tunnel washer, it could be conducted in other continuous and batch-type bleaching ranges. Also, chemical additions to the rinse water could lower the time and/or volume of water necessary to rinse the goods after the bleaching bath and, therefore, decrease the number of chambers required for rinsing. It should be understood that all such modifications and improvements have been deleted herein for the sake of conciseness and readability but are properly within the scope of the following claims.

I claim:

1. A method of bleaching cellulosic materials comprising cotton or cotton blended fabrics, comprising the steps of:

(a) providing a silicate-free bleach liquor wherein said bleach liquor consists essentially of about 2 wt % of hydrogen peroxide, about 1 wt % of potassium hydroxide, about 1.5 wt % of a magnesium salt stabilizer, and the balance water;

(b) heating the bleach liquor to less than about 180° F.;

(c) immersing the cellulosic material in the bleach liquor of step (b); and (d) separating the bleach liquor from the cellulosic materials.

2. The method according to claim 1, wherein said bleach liquor is heated to between about 160° and 175° F.

3. The method according to claim 1, wherein said cellulosic material is immersed in the bleach liquor between about 12 and 16 minutes.

4. The bleached cellulosic material produced according to claim 1.

* * * * *